May 20, 1924.
G. W. CRAWFORD
VALVE CONTROLLING DEVICE
Filed Jan. 5, 1923
1,494,996
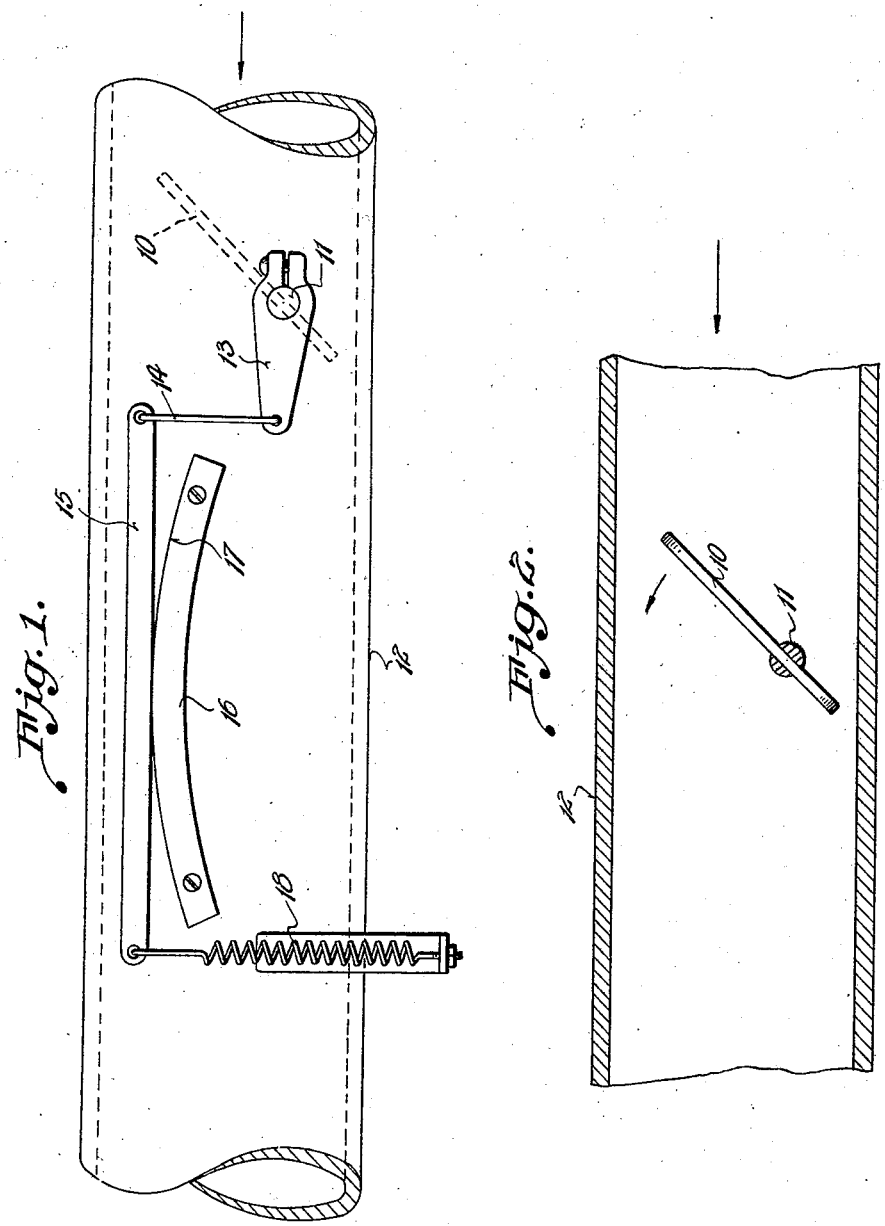
G.W. Crawford
INVENTOR
BY Victor J. Evans
ATTORNEY
WITNESS:

Patented May 20, 1924.

1,494,996

UNITED STATES PATENT OFFICE.

GUY WALLACE CRAWFORD, OF HESPERIA, MICHIGAN.

VALVE-CONTROLLING DEVICE.

Application filed January 5, 1923. Serial No. 610,888.

*To all whom it may concern:*

Be it known that I, GUY W. CRAWFORD, a citizen of the United States, residing at Hesperia, in the county of Newaygo and State of Michigan, have invented new and useful Improvements in Valve-Controlling Devices, of which the following is a specification.

The object of this invention is to control one of the valves of an internal combustion engine in such manner that as the current in the intake duct increases, tending to close the valve, the leverage exerted by a tension spring will increase, thereby compensating for the action specified.

A further object is to provide a lever having a variable fulcrum, with means for connecting the lever at one end with a crank element constituting the axis about which the valve rotates, and connecting the lever at the other end with a tension spring, for the purpose specified.

A still further object is to provide the axial member of the valve with a crank element connected with one end of a lever mounted to operate freely on an arc shaped support or fulcrum, the other end of the lever being connected with a tension spring, so that when the current in the duct increases and tends to close the valve, the point of bearing of the lever on its fulcrum will be shifted and greater leverage will be exerted by the spring, thereby resisting the tendency of the valve to close.

With the foregoing and other objects in view, the invention consists in the novel construction and arrangement of elements described and claimed, it being understood that modifications may be made within the scope of the claims without departing from the spirit of the invention.

In the drawings, Figure 1 shows the device in elevation, as applied to an intake duct; Figure 2 is a longitudinal section through the duct, the valve therein being in edge elevation.

The valve to be controlled is designated 10, and is mounted on an axial element 11 in a duct or intake 12.

The element 11 is provided with a crank 13, and a link or flexible element 14 connects the crank with the adjacent end of the lever 15. This lever and its supporting member 16 are important elements in the construction, the element 16 being in the form of a segment or arc shaped bearing plate or bar. the curved edge portion 17 of which affords a variable fulcrum for the lever.

A coiled tension spring 18 will have one end permanently connected to a stationary element, the other end of the spring being connected with the adjacent end member 15.

The result of this construction is that when the current in the duct 12, moving in the direction of the arrows, tends to close the valve 10, the crank 13 will exert a downward pull on the adjacent end of the lever 15 and shift the point of bearing on the plate 16, toward the right. The spring will now have increased leverage and will resist the tendency of the valve to move. When the pressure on the valve decreases, the reverse of this operation takes place, the bearing point of the lever shifting toward the left. When the valve 10 is partly closed under a given pressure, the tendency to close still further is increased, in the absence of a compensating device of the type here described.

What is claimed is:—

1. In a device of the class described, a valve, an element movable with the valve, a lever having one end connected with said element, a spring connected with the opposite end of the lever, and means providing a variable fulcrum for the lever.

2. In a device of the class described, a valve, an element movable with the valve, a lever having one end connected with said element, a spring connected with the opposite end of the lever, means providing a variable fulcrum for the lever, said means including a curved element on which the lever has its bearing.

3. In a device of the class described, a valve including an axial member, a crank secured to said member, a lever having one end connected with the crank, a tension spring connected with the opposite end of the lever, and an arc shaped bearing plate on which the lever is freely mounted, permitting the fulcrum of the lever to shift automatically when the valve moves toward closing position.

4. In a device of the class described, a valve positioned to move across an opening in a duct to close the latter, and means including a spring and a lever having a variable fulcrum, for compensating for the tendency of the valve to close under the action of a current flowing through the duct.

GUY WALLACE CRAWFORD.